Aug. 23, 1966 W. T. REYNOLDS 3,268,373

SUPERCONDUCTIVE ALLOYS

Filed May 21, 1963 4 Sheets-Sheet 2

3,268,373

SUPERCONDUCTIVE ALLOYS

William T. Reynolds, Peters Township, Washington County, Pa., assignor to Westinghouse Electric Corporation, Pittsburgh, Pa., a corporation of Pennsylvania Filed May 21, 1963, Ser. No. 282,035
13 Claims. (Cl. 148—32.5)

This invention is directed to a process for making superconductive alloy strip or wire having a high critical field and a high critical supercurrent density in a strong applied magnetic field and to the superconductive alloy strip or wire made thereby.

The phenomenon of superconductivity at cryogenic temperatures has been known for many years, but it is only recently that practical application of the phenomenon has become feasible. One such application is the fabrication of electromagnetic coils or solenoids from superconductive wire or strip for the development of high magnetic fields. A substantial degree of success has already been achieved with such electromagnetic coils and magnetic fields in excess of 50,000 gauss have been developed.

In producing superconductive magnetic coils, the phenomenon of superconductivity in certain metals and alloys is relied upon. Briefly, as a coil of the wire of the metal is cooled there is reached a point usually within several degrees of absolute zero (such point being specific to the particular metal or alloy, and known as the "critical temperature") at which the metal loses its normal resistance to the flow of electrical current and a small electrical current will flow in the coil more or less indefinitely, and the metal is in what is called the superconducting state. This property of superconductivity is maintained at temperatures below the critical temperature and disappears above the critical temperature. The amount of electrical current that the conductor can carry in the superconductive state has a maximum, known as the "critical supercurrent density"—$J_c$, which if exceeded causes the conductor to lose its superconducting properties. Further, a wire or coil in the superconductive state is affected by a magnetic field either self-induced or externally applied, which if of high enough density will cause the conductor to lose its superconductive properties, such magnetic field being designated the "critical field"—$H_c$. At magnetic fields of values less than the "critical field," the conductor can carry only a certain maximum supercurrent density, the maximum supercurrent density increasing with lower magnetic flux density on the conductor.

Many of the electromagnetic coils of high quality which have been made have been wound from niobium-zirconium alloy wire. This niobium-zirconium alloy wire must be hot worked initially and annealed at least once in the course of cold working to maintain the material in a workable condition. Further, niobium-zirconium wire employs a relatively high proportion of niobium therein and is consequently quite expensive.

The niobium-titanium alloy system is a superconductive alloy system but has not been extensively investigated. This alloy system possesses several characteristics which are attractive for superconductor applications. First, the critical temperature is above 9.0° K. for binary niobium-titanium alloys containing from 0 to approximately 60 atom percent titanium. Second, the resistive critical field at 4.2° K. is approximately 120 kilogauss. Third, titanium is a relatively cheap and an abundant alloy component.

Accordingly, it is the object of the invention to provide a superconductive alloy conductor having a high critical field and a high critical supercurrent density in strong applied magnetic fields of a magnitude approaching that of the critical field.

It is a further object of the invention to provide a process for heat treating niobium-titanium superconductive alloys to increase the critical field and critical supercurrent densities thereof.

Other objects and advantages of the invention will, in part, be obvious and will, in part, appear hereinafter.

For a better understanding of the nature and objects of this invention, reference should be had to the following detailed description and to the drawings, in which.

Figure 2:
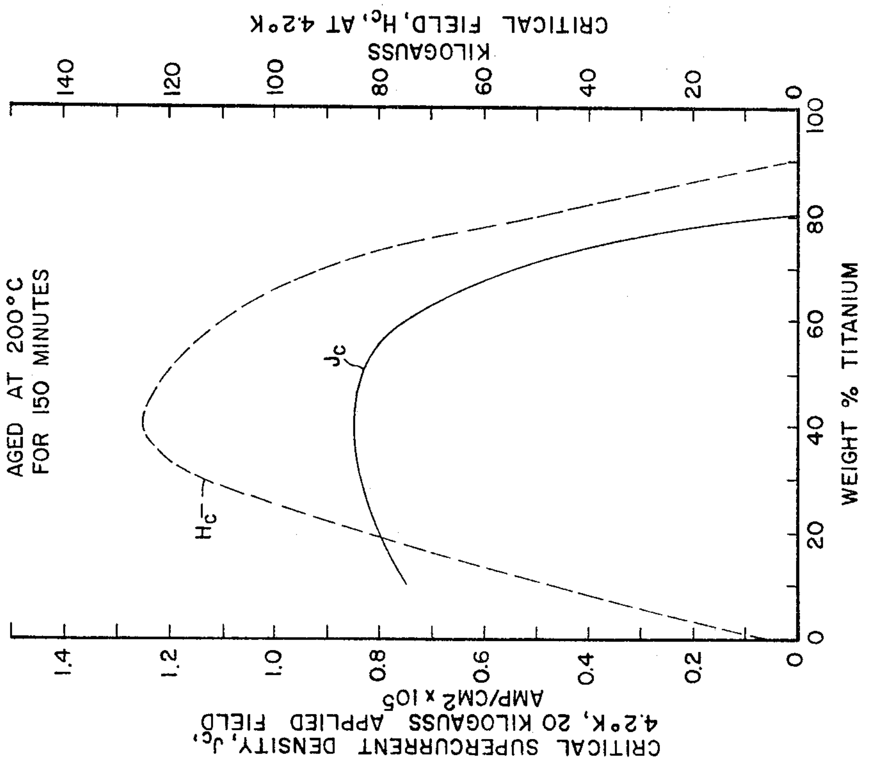
FIG. 2 is a graph similar to that of FIG. 1 in which niobium-titanium alloys have been cold rolled, aged at room temperature and heat treated at 200° C. for 2½ hours.

In accordance with this invention, the niobium-titanium superconductor alloys are subjected to a treatment at a moderately elevated temperature above 100° C. for a relatively short period of time. It has been found that this heat treatment is of a substantial benefit only to those alloys containing over 10% titanium.

The invention broadly comprises a superconductive alloy conductor composed of from about 10% to about 75% by weight of titanium, and the balance niobium except for small amounts of impurities, the alloy conductor having been subjected to a cold reduction of at least 96% to produce a wire or strip therefrom and thereafter heat treated at temperatures of 100° C. and higher for at least 0.1 hour, and preferably longer to provide that the conductor is characterized by a relatively high critical field under superconductive conditions and possesses improved critical supercurrent density in applied magnetic fields approaching the magnitude of the critical field.

More specifically, superconductive conductors of the invention comprise an alloy which has been subjected to a cold reduction of at least 99% to produce a thin strip or wire conductor, the conductor exhibiting under superconductive conditions a relatively high supercurrent density in an applied magnetic field of 20 kilogauss, the alloy conductor composed of from about 10% to about 75% by weight of titanium and the balance niobium except for small amounts of impurities, the alloy conductor having been heat treated for from about 0.1 hour to about 5 hours at temperatures in the range of from about 100° C. to 550° C.

A preferred superconductive conductor of the invention comprises an alloy which has been subjected to a cold reduction of at least 99% to produce a thin wire or strip, the conductor exhibiting under superconductive conditions a critical field of at least 50 kilogauss and a critical supercurrent density of at least about $0.4 \times 10^5$ amps/cm.$^2$ in a magnetic field of 20 kilogauss, the alloy conductor composed of from about 10% to about 75%, by weight, of titanium, and the balance niobium except for small amounts of impurities, the alloy conductor having been heat treated for from about 0.1 hour to about 5 hours at a temperature of about 200° C.

Still another preferred superconductive conductor comprises an alloy which has been subjected to a cold reduction of at least 99%, the conductor exhibiting under superconductive conditions a critical field of at least 70 kilogauss and a critical supercurrent density of at least about $0.7 \times 10^5$ amps/cm.$^2$ in an applied magnetic field of 20 kilogauss, the alloy conductor composed of from about 10% to about 75% by weight of titanium and the balance niobium except for small amounts of impurities, the alloy conductor having been heat treated at a temperature of about 400° C. for from 0.1 to 5 hours.

A heat treatment at temperatures in the range from 200° C. to 550° C. is extremely beneficial when applied to highly cold reduced alloy strip or wire containing at least 10% titanium. At heat treatment temperatures in excess of 600° C. the beneficial effect of heat treatment is slight. At 700° C. the beneficial effect has essentially disappeared. In general, 600° C. is a practical maximum for heat treatment.

An investigation of the niobium-titanium alloy system revealed that members of these alloys in the cold worked condition have low critical supercurrent density in high magnetic fields. Supercurrent density values for a number of alloys have been determined as follows:

TABLE I

| Composition (wt. percent) | Cold work percent reduction in area | Field applied parallel to rolling direction (kilogauss) | Critical supercurrent density at 4.2 K. (amp./cm.$^2$) |
|---|---|---|---|
| Nb–18.1 Ti | 96.4 | 19.5 | 15,850 |
| Nb–26.0 Ti | 96.4 | 19.0 | 4,530 |
| Nb–9.88 Ti | 99.428 | 20.0 | 18,039 |
| Nb–19.83 Ti | 99.423 | 20.0 | 8,279 |
| Nb–40.50 Ti | 99.374 | 20.0 | 3,310 |
| Nb–57.59 Ti | 99.413 | 20.0 | 7,640 |
| Nb–80.36 Ti | 99.428 | 20.0 | 0 |

These values of critical supercurrent density are not sufficiently high for niobium-titanium alloys in the cold worked condition to be given serious consideration for superconductor applications.

It is the remarkable discovery of this invention that a means comprising a heat treatment, with or without room temperature aging, has been found by which the critical supercurrent density of highly cold reduced niobium-titanium alloys can be increased to a surprisingly high level. Other advantages also obtain as will be set forth herein.

The following is an example illustrating the practice of the invention.

*Example*

A 2½ inch diameter of a niobium-60% titanium alloy with small amounts of incidental impurities is prepared by vacuum arc melting a composite electrode composed of 40 parts by weight of electron beam melted niobium (99.90% niobium) and 60 parts by weight of arc-melted titanium (99.35% titanium). The vacuum arc-melted ingot is machined to remove surface roughness and imperfections. The ingot is then homogenized in the temperature range 900°–1400° C. in a vacuum of less than $10^{-4}$ mm. Hg for a period of several hours. The ingot is then cold forged to a slab having the dimensions 1" x 1" x 3". After the slab is surface conditioned by machining, it is then cold rolled to 0.03" thick strip with reductions of 10% to 20% per pass. The 0.03" strip is then cold rolled in a four-high rolling mill with reductions of 5% to 10% per pass to a final thickness of .003". The strip of final thickness is then heat treated at 400° C. for 2½ hours in a vacuum annealing furnace.

Figure 1:
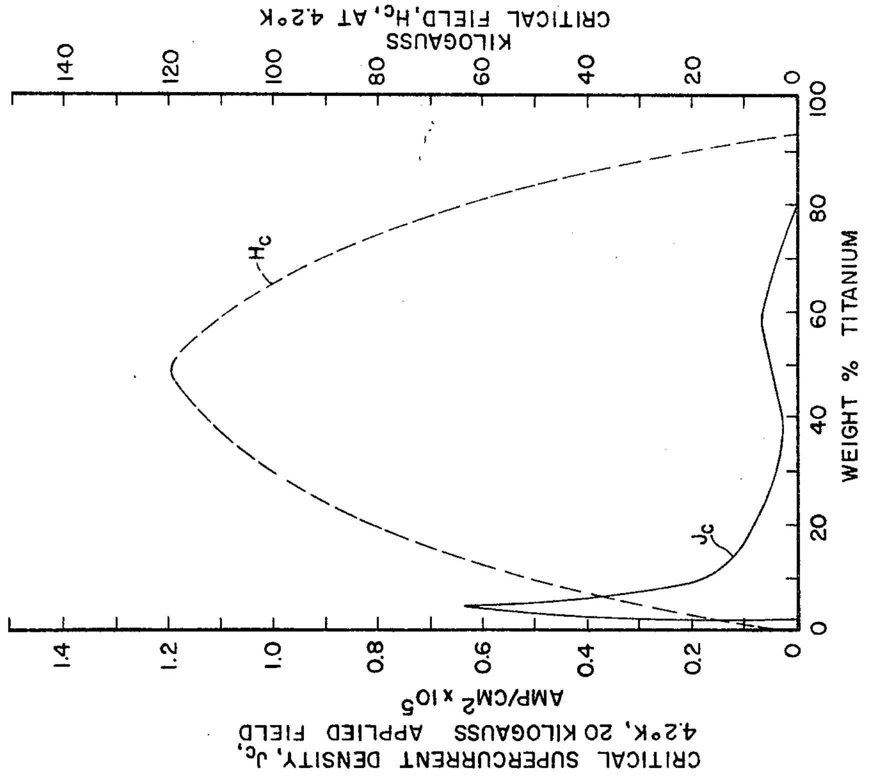
FIGURE 1 is a graph in which the critical field and the critical supercurrent density in a field of 20 kilogauss for an as-rolled niobium-titanium alloy are plotted against the titanium content of the alloy.

Similarly to this example, a series of niobium-titanium alloy strips were prepared with from 2% to 94% by weight of titanium. The results of cryogenic testing of the niobium-titanium alloy strips of this invention so prepared are set forth in the FIGS. 1 through 6. FIG. 1 which is derived from the result of tests on niobium-titanium alloy strips in essentially the as-rolled condition shows that the supercurrent density $J_c$ of the alloys in a 20 kilogauss field attains desirable values at titanium contents of well below 20% and particularly below 10%. The critical field $H_c$ in the same composition range is relatively poor and does not attain usefully high levels and is good only when titanium is at least about 20%. It should be noted that the critical supercurrent density falls off rapidly as the titanium content approaches 30% while at the same time the critical field is attaining a desirable high level.

FIG. 2 is directed to the niobium-titanium alloy strips which have been cold rolled, aged at room temperature about four months and heat treated at 200° C. for 2½ hours. There is a phenomenal change in the properties of the alloys as compared to FIG. 1. Particularly, it should be noted that the critical field and the critical supercurrent density are at relatively high levels in alloys containing 10% or more titanium and achieve maximum values in the broad composition range of from 10% to 60% titanium. The critical field attains the value of about 126 kilogauss.

Figure 3:
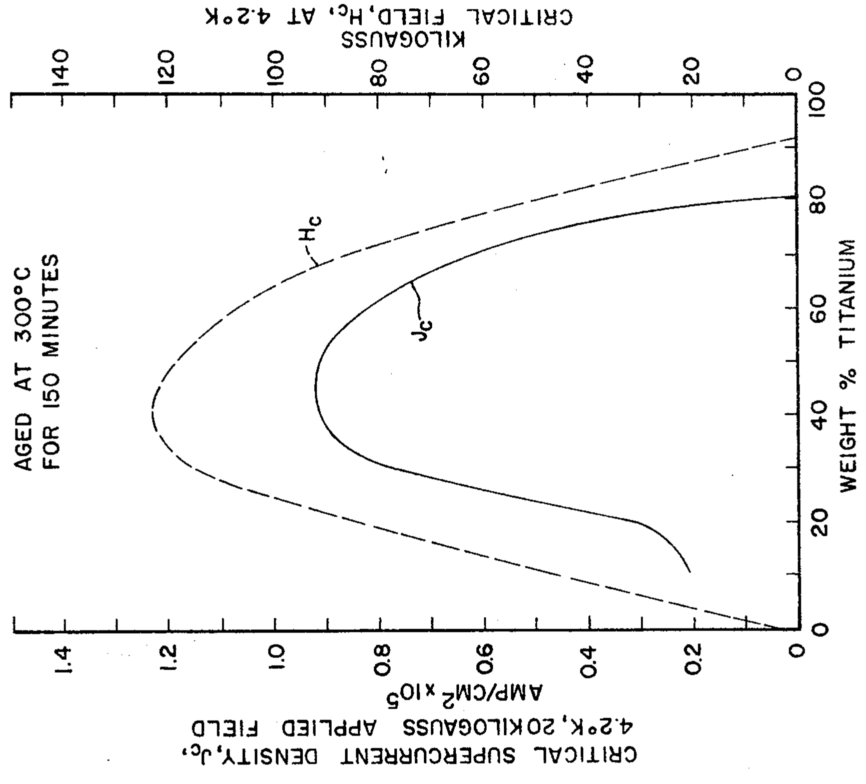
FIG. 3 is a graph similar to that of FIG. 1 in which the niobium-titanium alloys have been cold rolled, aged at room temperature and heat treated at 300° C. for 2½ hours.

FIG. 3 is directed to the niobium-titanium alloy strips which have been cold rolled, aged at room temperature about five months and heat treated at 300° C. for 2½ hours. The supercurrent density achieves a maximum of about $0.9 \times 10^5$ amps./cm.$^2$ in alloys containing about 40% titanium and the supercurrent density is over $0.7 \times 10^5$ amps/cm.$^2$ from about 30% to over 65% titanium.

Figure 4:
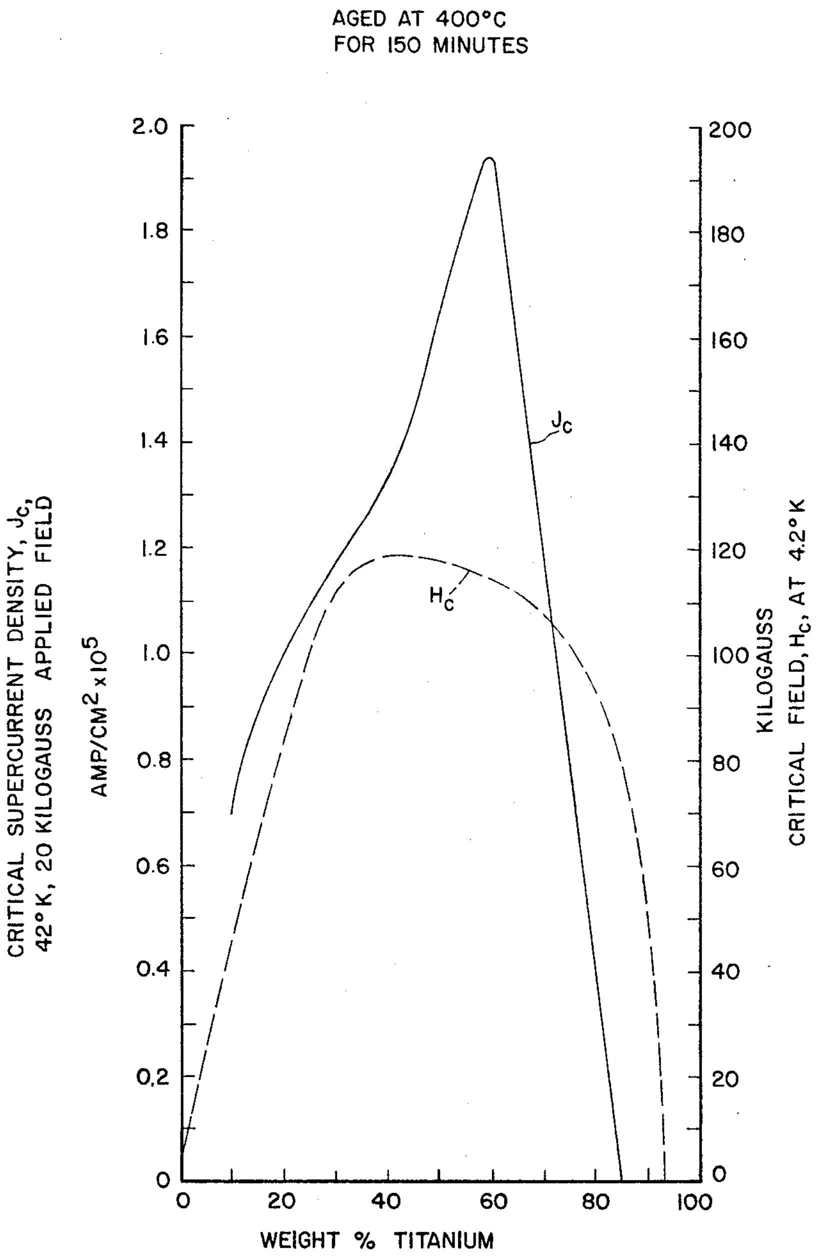
FIG. 4 is a graph similar to that of FIG. 1 in which the niobium-titanium alloys have been cold rolled, aged at room temperature and heat treated at 400° C. for 2½ hours.

FIG. 4 is directed to the niobium-titanium alloy strips which have been cold rolled, aged at room temperature about five months and heat treated at 400° C. for 2½ hours. The drastic increase which has occurred in the critical supercurrent density curve is of particular interest. It should be noted that the curve attains an extremely high maximum and is at a level of over $1.0 \times 10^5$ amps./cm.$^2$ in the applied field of 20 kilogauss over the composition range from 20% titanium to over about 70% titanium. Surprisingly, the critical field is also substantially increased by this heat treatment in the composition range 50% to about 80% titanium. Exceedingly good critical field values appear over the range of 20% titanium to about 80% titanium.

Figure 5:
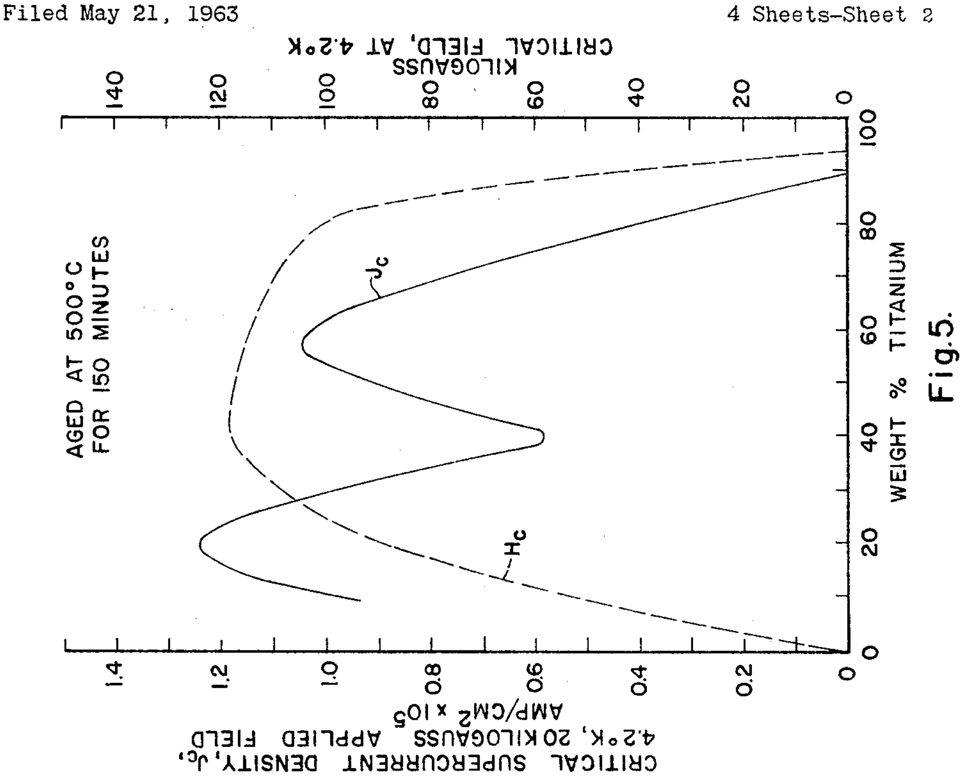
FIG. 5 is a graph similar to that of FIG. 1 in which the niobium-titanium alloys have been cold rolled, aged at room temperature and heat treated at 500° C. for 2½ hours.

FIG. 5 is directed to the niobium-titanium alloy strips which have been cold rolled, aged at room temperature about five months, and heat treated at 500° C. for 2½ hours. It is noted that in niobium-titanium alloys containing less than 30%, the critical supercurrent density in a field of 20 kilogauss achieves a maximum at about 20% titanium. Between 20% titanium and 40% titanium critical supercurrent density decreases and critical field increases as titanium content is increased. Optimum properties in alloys containing more than 40% titanium are limited to a relatively narrow composition range of from 45% to 70% titanium.

Figure 6:
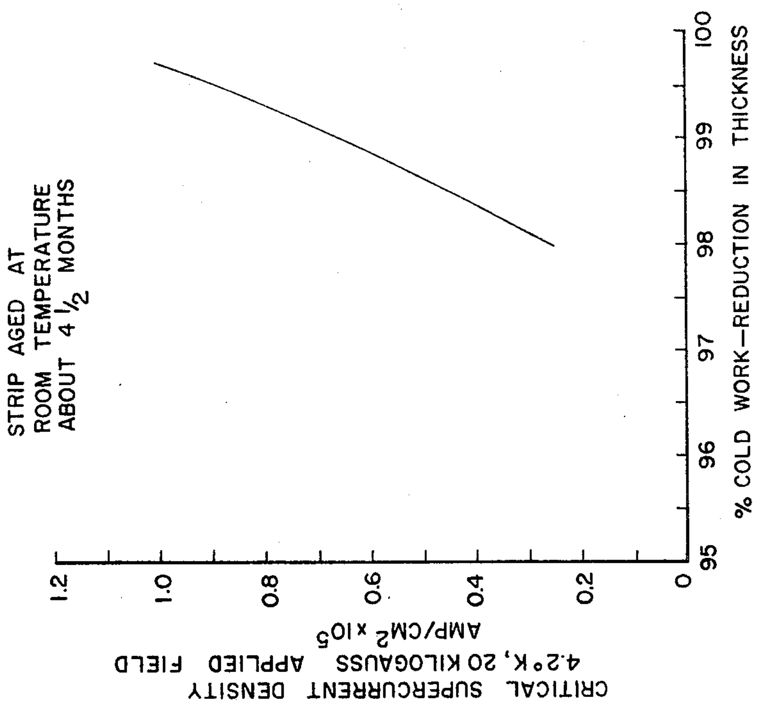
FIG. 6 is a graph in which critical supercurrent density is plotted against the degree of cold work in an Nb-19.83% titanium alloy.

It has been found that the amount of cold reduction greatly affects the critical supercurrent density of the alloy conductors of the invention. At least 96% cold reduction must be employed, and greater reductions will produce better alloy members. In fact, reductions in excess of 99% are desirable and improvement continues as the degree of cold reduction reaches and exceeds 99.99%. Typical results obtained with increasing amounts of cold work are shown in FIG. 6.

In some cases, the improvement achieved by cold working alone is sufficient to render the alloy superconductors of this invention useful in superconductive magnets without further heat treatment. Thus, a 50% titanium-niobium alloy wire of 0.005" diameter, which has undergone a reduction in area of 99.9996% exhibited a supercurrent density of about $1\times10^5$ amps./cm.$^2$ in an applied field of 20 kilogauss. Moderate improvement in this property would be expected in cold worked wire placed in service as the amount of room temperature aging accumulates. However, heat treatment above 100° C. to 550° C. will further improve the superconductive properties of the wire to give a total of 50% increase in $J_c$.

Figure 7:
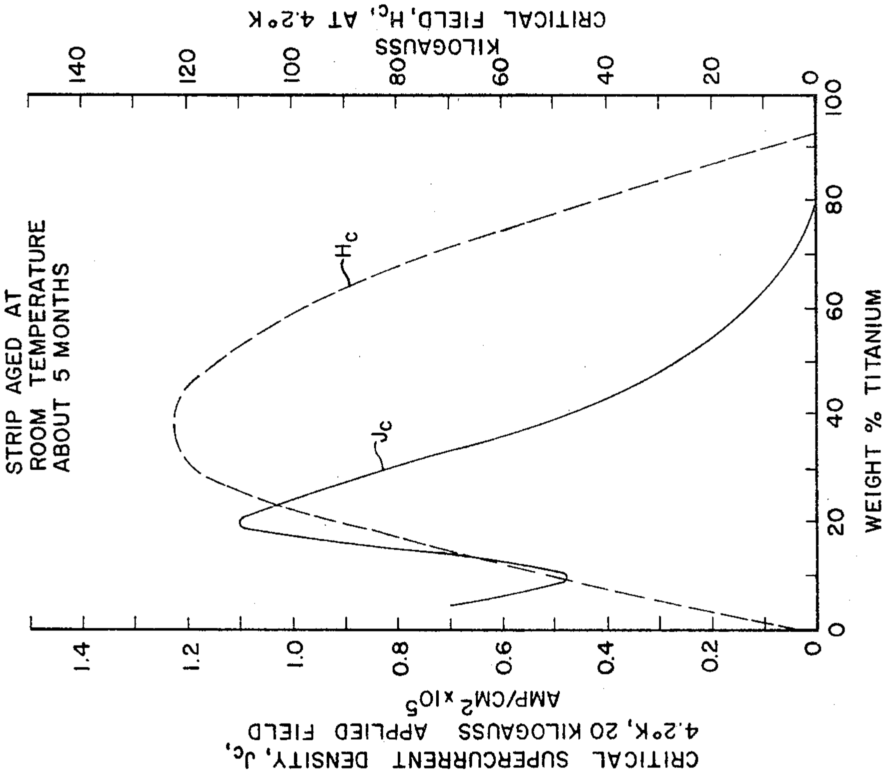
FIG. 7 is a graph similar to that of FIG. 1 in which the niobium-titanium alloys have been cold worked and aged at room temperature.

It has been found that definite improvement in the supercurrent densities of the cold worked alloys of this invention can be effected by prolonged aging at approximately room temperature (see FIG. 7). The term "room temperature" is intended to include temperatures in the range of about 10° C. to 50° C. For even small improvement in properties at least thirty days of room temperature aging is required. Continued slow improvement in properties is observed up to a year and more of aging at room temperature. However, maximum current densities cannot be attained by aging at room temperature.

Generally speaking, highest properties are attained in alloys aged for several months at room temperature and then heat treated at the elevated temperature. It is clear that a technique calling for several months of aging at room temperature is hardly a commercially desirable process. Further, the alloys of this invention have been aged at elevated temperatures promptly after cold working and it has been found that very high current density values are attained, values entirely satisfactory from the commercial point of view and approaching the values in FIGS. 2 to 5. It will be understood that a small amount of aging at room temperature will occur in most cases due to the normal time interval between cold working and aging at elevated temperature. This time interval at room temperature normally will not exceed two or three weeks, and may amount to only a few hours or days. As has been pointed out, such short times at room temperature will not significantly affect the supercurrent density. After aging at elevated temperature, additional time at room temperature will not affect the supercurrent density.

The niobium-titanium alloys in accordance with this invention are comparable in their superconductive properties to the niobium-zirconium alloys now in use. The alloys of the invention are relatively easy to cold work. The relatively large proportion of titanium characterizing many of the alloys of this invention, results in a much less expensive superconductive material.

From the foregoing disclosure and data, it is evident that the present invention provides superconductive materials having properties which are highly useful in superconductive applications.

The inventive principles embodied in the above description may obviously be incorporated in modified processes by those skilled in the art without departing from the spirit and scope of this invention, and it is intended that the description be interpreted as illustrative and not in a limiting sense.

I claim as my invention:

1. A superconductive alloy conductor which has been subjected to a cold reduction of at least 96%, said conductor exhibiting under superconductive conditions a relatively high critical field and improved critical supercurrent density in a strong applied magnetic field, said alloy conductor composed of from about 10% to 75% by weight of titanium and the balance niobium except for trace amounts of impurities, the alloy conductor having been heat treated for at least 0.1 hour at temperatures in the range of 100° C. to 600° C.

2. A superconductive alloy conductor which has been subjected to a cold reduction of at least 99%, said conductor exhibiting under superconductive conditions a critical field of at least 50 kilogauss and a critical supercurrent density of at least $0.4\times10^5$ amps./cm.$^2$ in a magnetic field of 20 kilogauss, said alloy conductor composed of from about 10% to 75%, by weight, of titanium, and the balance niobium except for trace amounts of impurities, the alloy conductor having been heat treated for from about 0.1 hour to 5 hours at temperatures in the range from 100° C. to 550° C.

3. A superconductive alloy conductor which has been subjected to a cold reduction of at least 99%, said conductor exhibiting under superconductive conditions a critical field of at least 50 kilogauss and a critical supercurrent density of at least $0.4\times10^5$ amps/cm.$^2$ in a magnetic field of 20 kilogauss, said alloy conductor composed of from about 10% to 75%, by weight, of titanium, and the balance niobium except for trace amounts of impurities, the alloy conductor having been heat treated for from about 0.1 hour to about 5 hours at a temperature of about 200° C.

4. The alloy conductor of claim 3 wherein after cold working the conductor is aged at approximately room temperature for at least one month prior to heat treatment at elevated temperature.

5. A superconductive alloy conductor which has been subjected to a cold reduction of at least 99%, said conductor exhibiting under superconductive conditions a critical field of at least 70 kilogauss and a critical supercurrent density of at least $0.7\times10^5$ amps/cm.$^2$ in a magnetic field of 20 kilogauss, said alloy conductor composed of from about 10% to 75%, by weight, of titanium and the balance niobium except for trace amounts of impurities, the alloy conductor having been heat treated for from about 0.1 hour to about 5 hours at a temperature of about 400° C.

6. The alloy conductor of claim 5 wherein after cold working the conductor is aged at approximately room temperature for at least one month prior to heat treatment at elevated temperature.

7. A superconductive alloy conductor which has been subjected to a cold reduction of at least 99%, said conductor exhibiting under superconductive conditions a critical field of at least 100 kilogauss and a critical supercurrent density of at least $1.0\times10^5$ amps/cm.$^2$ in a magnetic field of 20 kilogauss, said alloy conductor composed of from about 20% to 70%, by weight, of titanium, and the balance niobium except for trace amounts of impurities the alloy conductor having been heat treated for from about 0.1 hour to about 5 hours at a temperature of about 400° C.

8. The alloy conductor of claim 7 wherein after cold working the conductor is aged at approximately room temperature for at least one month prior to heat treatment at elevated temperature.

9. A superconductive alloy conductor which has been subjected to a cold reduction of at least 99%, said conductor exhibiting under superconductive conditions a critical field of at least 100 kilogauss and a critical supercurrent density of at least $1.5\times10^5$ amps/cm.$^2$ in a magnetic field of 20 kilogauss, said alloy conductor composed of about 60%, by weight, of titanium, and the balance niobium except for trace amounts of impurities, the alloy conductor having been heat treated for about 2½ hours at a temperature of about 400° C.

10. The alloy conductor of claim 9 wherein after cold working the conductor is aged at approximately room temperature for at least one month prior to heat treatment at elevated temperature.

11. A superconductive alloy conductor which has been subjected to a cold reduction of at least 99%, said conductor exhibiting under superconductive conditions a critical field of at least 70 kilogauss and a critical supercurrent density of at least $0.7\times10^5$ amps/cm.$^2$ in a magnetic field of 20 kilogauss, said alloy conductor composed of from about 45% to 70% by weight of titanium and the balance niobium except for trace amounts of impurities, the alloy conductor having been heat treated at a temperature of from 350° C. to 550° C. for from 2 to 4 hours.

12. The alloy conductor of claim 11 wherein after cold working the conductor is aged at approximately room temperature for at least one month prior to heat treatment at elevated temperature.

13. A superconductive coil comprising a plurality of turns of a conductor comprising a highly cold reduced alloy consisting essentially of from about 10% to 75% by weight of titanium and the balance niobium except for incidental impurities, the conductor having been heat treated at least .1 hour at temperatures in the range of 100° C. to 600° C.

References Cited by the Examiner

UNITED STATES PATENTS

| | | | |
|---|---|---|---|
| 2,822,268 | 2/1958 | Hix | 75—174 |
| 2,940,845 | 6/1960 | Jaffee | 75—175.5 |
| 3,038,798 | 6/1962 | Berger | 75—175.5 XR |
| 3,167,692 | 1/1965 | Matthias | 75—175.5 XR |

DAVID L. RECK, *Primary Examiner.*

C. N. LOVELL, *Assistant Examiner.*